Dec. 25, 1951      K. KLINKSIEK      2,579,585

STATOR WINDING MACHINE

Filed June 23, 1947      7 Sheets-Sheet 1

INVENTOR:
KARL KLINKSIEK
BY
ATTORNEY.

Dec. 25, 1951 — K. KLINKSIEK — 2,579,585
STATOR WINDING MACHINE
Filed June 23, 1947 — 7 Sheets-Sheet 3

INVENTOR:
KARL KLINKSIEK
BY E. E. Huffman
ATTORNEY.

Dec. 25, 1951  K. KLINKSIEK  2,579,585
STATOR WINDING MACHINE
Filed June 23, 1947  7 Sheets-Sheet 4

INVENTOR:
KARL KLINKSIEK
BY
ATTORNEY.

Dec. 25, 1951 K. KLINKSIEK 2,579,585
STATOR WINDING MACHINE
Filed June 23, 1947 7 Sheets-Sheet 6

INVENTOR:
KARL KLINKSIEK
BY E. E. Huffman
ATTORNEY.

Dec. 25, 1951   K. KLINKSIEK   2,579,585
STATOR WINDING MACHINE
Filed June 23, 1947   7 Sheets-Sheet 7

INVENTOR:
KARL KLINKSIEK
BY *E. E. Huffman*
ATTORNEY.

Patented Dec. 25, 1951

2,579,585

UNITED STATES PATENT OFFICE 2,579,585

STATOR WINDING MACHINE

Karl Klinksiek, Richmond Heights, Mo., assignor to Wagner Electric Corporation, St. Louis, Mo., a corporation of Delaware Application June 23, 1947, Serial No. 756,370

10 Claims. (Cl. 242—1)

This invention relates to a machine for applying the coils to the stator of a dynamoelectric machine or to any other annular structure requiring the application of coils to slots formed in the inner face thereof.

The general object of my invention is to provide a reliable and efficiently operating stator winding machine which is capable of simultaneously winding on a stator core all of the required stator windings whether a stator having two or four or more poles is required. The specific machine herein described and illustrated is adapted to simultaneously form the windings for a four pole stator.

Among the specific objects of the invention are to provide novel and improved wire carrying and guiding elements whereby the coils can be accurately and rapidly applied.

Other objects and advantages of my invention will appear from the following more detailed description.

Referring now to the drawings and to Figures 1, 2, 3, 4, 5, and 6 in particular, numeral 1 designates a suitable frame for the machine in which a driving motor 2 is secured which drives the main shaft 3 by means of the belt 4. A hand wheel 91 is secured to the other end of shaft 3 to manually rotate it. A shaft 5 is rotatably mounted in frame 1 and carries a gear 6 which meshes with a gear 7 secured to shaft 3. Shaft 5 has a beveled gear 8 secured thereto which meshes with a bevel gear 9 secured to a vertical shaft 10 rotatably mounted in the machine frame 1. A crank wheel 11 is secured to shaft 10 and is provided with a radially adjustable pin 12 to which one end of a connecting rod 13 is secured and whose other end is pivotally connected to a slide 14 mounted in ways 15 and 16 carried by the machine frame 1 and to which slide the reciprocable ram 18 is connected.

Numeral 17 is a U-shaped sub-frame element mounted on machine frame 1 and in which is mounted the reciprocating ram 18 which at one end carries the wire threading shuttles subsequently described. The gear 19 is splined to ram 18 in order to permit reciprocatory motion of ram 18 relative to gear 19.

Figure 6:
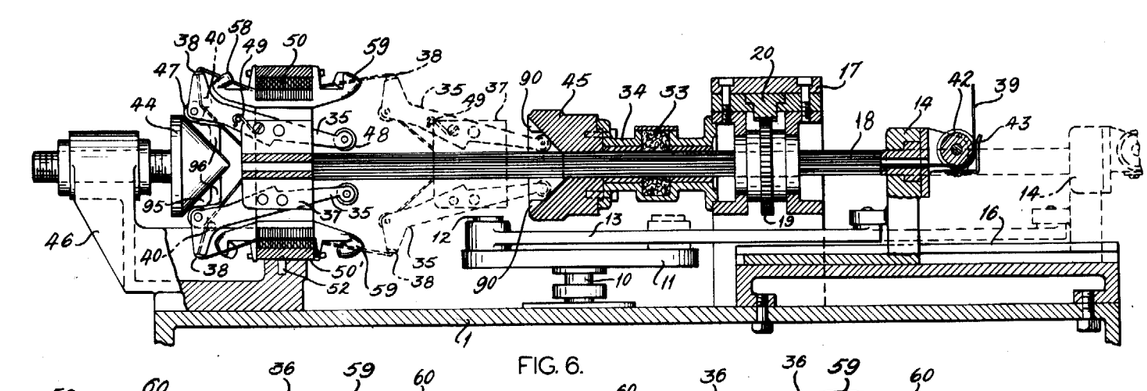
Figure 6 shows a vertical sectional view of the upper part of the machine and taken substantially along the line 6—6 of Figure 2.

A plurality of wire carrying shuttles 35 is mounted at the left hand end of ram 18 (see Figures 6, 8, and 9), there being one of said shuttles for each pole of the stator core which is being wound. Only two shuttles are shown in the figures just mentioned in order to simplify the illustration. Each of these shuttles 35 is pivotally mounted on a head 37 secured to the end of ram 18 and each is provided with a thimble 38 through which the wire 39 is passed. The wire 39 for each shuttle 35 is derived from a suitable reel (not shown) and enters the bore in ram 18 at the right hand end thereof after passing around grooved guide roller 42 (Figure 6). A unidirectional motion of wire 39 to the left in ram 18 is insured by means of member 43 secured to the ram, the vertical portion thereof being made resilient and engaging the wire as it passes around grooved guide roller 42. The wire 39 then passes around a guide roller 41 (Figure 9) rotatably mounted in head 37, then passes around a guide roller 40 rotatably mounted in shuttle 35, and then through thimble 39.

The wire for forming the coils is brought into alignment with the desired slots in the stator core by means of the shuttles 35, the wire carrying ends of which are moved radially by guide member 44 during the final portion of the movement of ram 18 in one direction and by the guide member 45 during the final portion of movement of the ram in the opposite direction. Guide member 44 is secured to a sub-frame 46 mounted on the machine frame 1 and member 45 is secured to housing 34 of the ram lubricating means 33. Each shuttle 35 is provided with bearing rollers 47 and 48, one at each end thereof, for engagement with the operative surfaces of guide members 44 and 45, respectively. The major portion of the surface of each of these guide members is conical but member 45 is provided with a guide portion 90 and member 44 with guide portions 95 and 96. For purposes hereinafter explained, these guide portions 90, 95, and 96 are of different conformation from the remainder of the operative surfaces of members 44 and 45. A spring 49 acts on each shuttle 35 to maintain the bearing rollers 47 and 48 in engagement with the surfaces of guide members 44 and 45 when they are radially aligned with said surfaces. During the final portion of the movement of the ram in one direction, roller 47 rides up the conical surface of member 44 and moves the end of the shuttle upward to bring the wire carrying thimble 38 into the position indicated, for example, in Figure 6, and during the final portion of the motion of the ram in the other direction, roller 48 rides down the conical surface of member 45 to again elevate the wire to a position with respect to the stator core corresponding to that to which it was brought by the full travel of the ram in the other direction.

Figure 4:
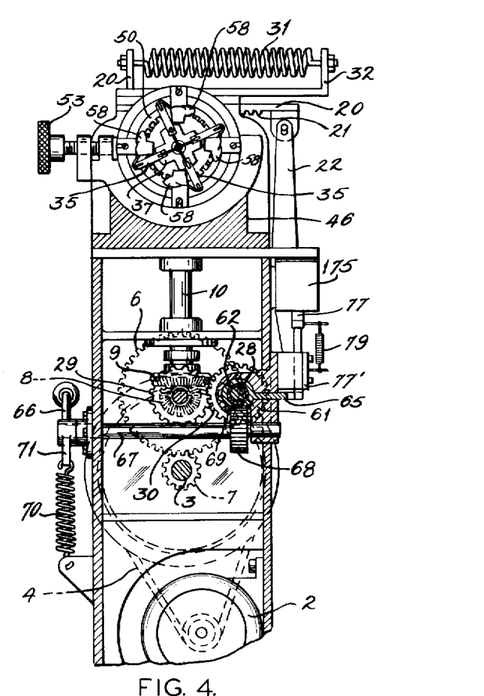
Figure 4 shows a sectional view taken substantially along the line 4—4 of Figure 1 showing the stator core in position.
Figure 5:
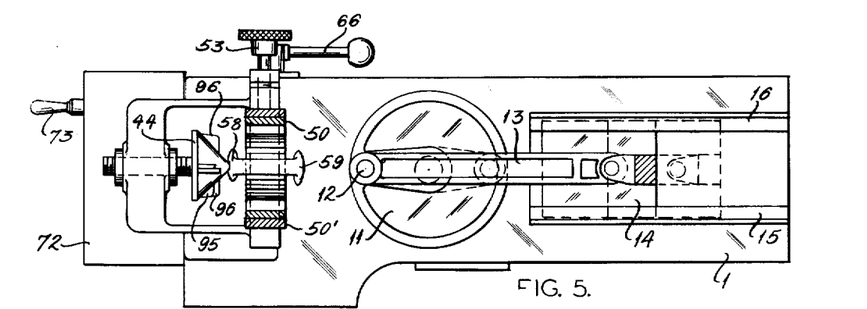
Figure 5 shows a sectional view taken substantially along the line 5—5 of Figure 1 and with the stator core inserted.

The stator core 50 is fitted into a stator ring 50' which is mounted in a recess formed in the sub-frame 46 secured to frame 1 and is aligned in said recess by a dowel pin 52 secured in sub-frame 46 which cooperates with a suitable aperture in ring 50' (see Figure 6). The stator ring 50' is clamped in position in the sub-frame 46 by means of a clamping screw 53 (Figure 4).

Figures 11, 12:
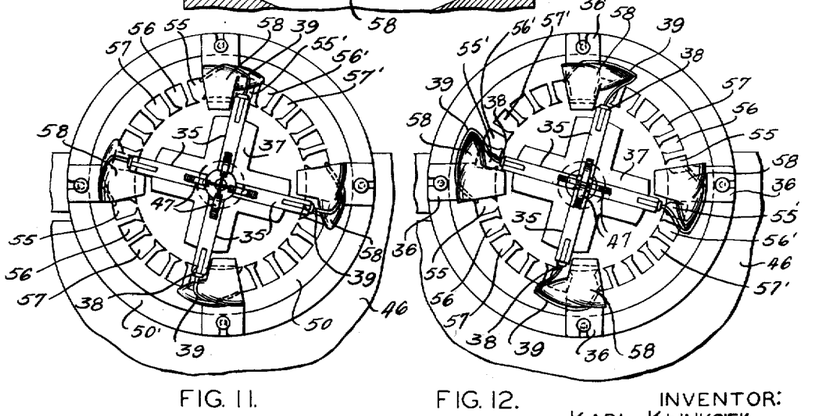

Referring to the four-pole stator illustrated, for example, in Figure 11, each pole is provided with a three-part winding, the coils of the winding for the pole at the top of the figure occupying slot pairs 55, 55', 56, 56' and 57, 57'. When a predetermined number of winding turns in applied to slots 55, 55', the degree of oscillation of the winding head 37 is increased to cause the winding turns to be next applied to slots 56, 56' and when a sufficient number of turns has been applied to these slots, the oscillation of the head is again increased to apply the required number of turns to slots 57 and 57'.

Figure 7:
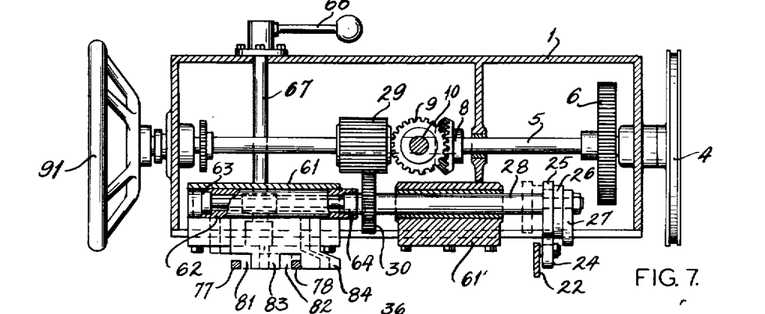
Figure 7 shows a horizontal sectional view taken substantially along the line 7—7 of Figure 1.

The above mentioned oscillation of the winding head is produced by the mechanism now to be described. The slide 20 in sub-frame 17 has a rack 21 formed on one side thereof which engages with gear 19 to rotate ram 18 to the extent necessary to make the desired changes in rotative position of winding head 37. The rack is moved in one direction by the rocking arm 22 pivotally supported on the machine frame at 23. The slide is biased to move in the opposite direction by means of a spring 31 attached at one end to bracket 32 of sub-frame 17 and at the other end to the slide. The lower end of the rocking arm is provided with a cam follower roller 24 to be selectively engaged by cams 25, 26, and 27 (Figure 7, for example) which cams are mounted on shaft 28 which is rotated from shaft 5 through gears 29 and 30. Shaft 28 is slidable longitudinally in its bearings 61 and 61'. The shaft bearing means comprises a cylindrical sleeve 62 having counterbores at the ends thereof into which collars 63 and 64 on shaft 28 are received. Sleeve 62, therefore, moves longitudinally with the shaft. Sleeve 62 is provided with a plate structure 65 which extends through a suitable slot in the wall of the frame and 65 is provided with abutments by means of which the several longitudinally adjusted positions of shaft 28 are determined. Shaft 28 may be manually shifted longitudinally by gear 68 which meshes with rack 69 on sleeve 62 in which shaft 28 is mounted, this gear 68 being mounted on rotatable shaft 67 operable by lever 66. Spring 70 is secured at one end to the frame of the machine and at the other end is secured to lever 71 on shaft 67 to bias shaft 28 to the position in which cam 27 engages the follower roller 24 carried by the rocking arm 22. The position of rack 21 and, therefore, the rotative position of ram 18 is determined by the particular cam engaged by the roller 24 and the rotative position of that cam. In the schematic diagram of Figure 18 the rack 69 is shown as being on the upper side of sleeve 62 for illustrative purposes of that figure whereas in the machine it is below 62 as indicated in Figure 4.

Figure 1:
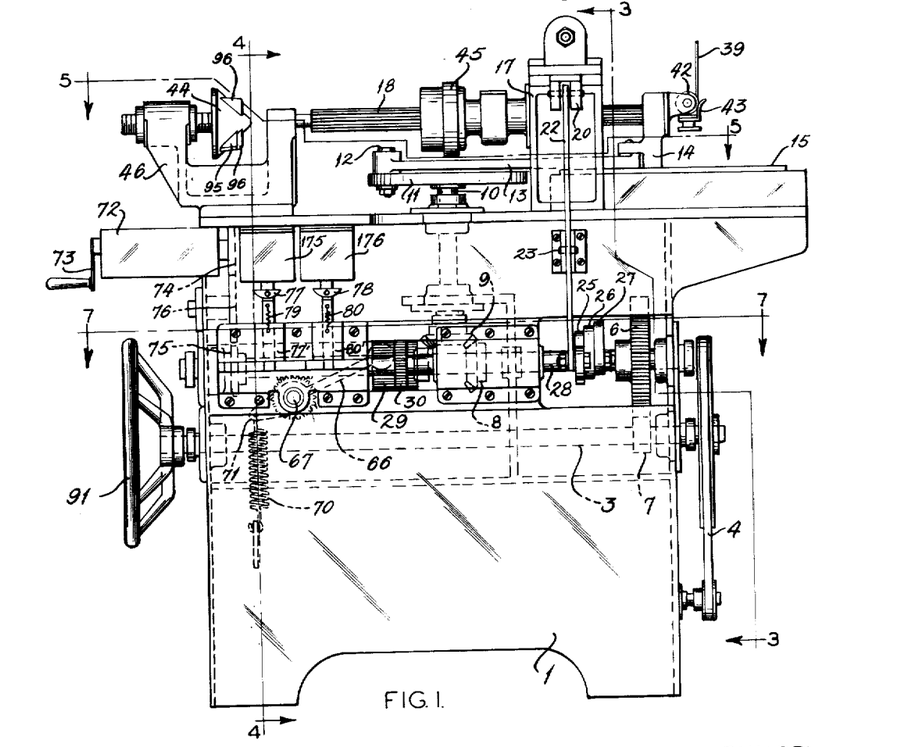
Figure 1 shows a side elevational view of a stator winding machine incorporating the invention but with the wire carrying shuttles and stator core omitted.
Figure 2:
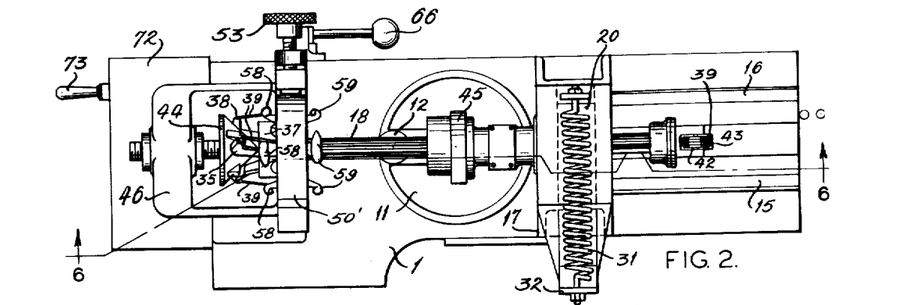
Figure 2 shows a plan view of the machine.
Figure 3:
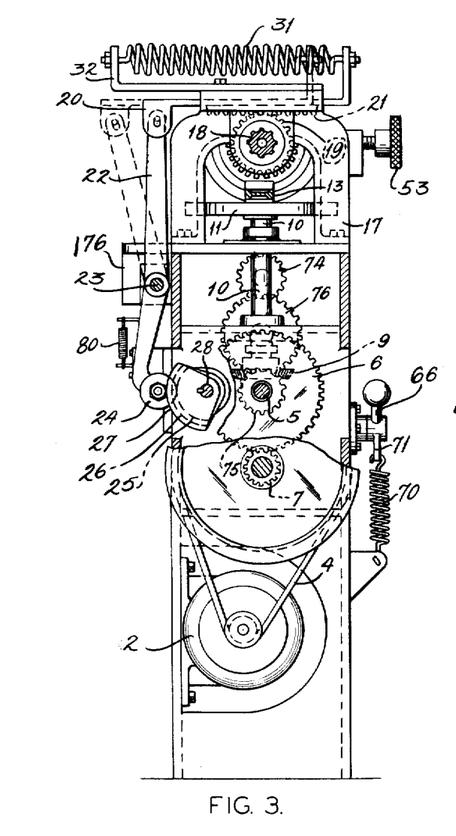
Figure 3 shows a sectional view taken substantially along the line 3—3 of Figure 1 but also showing the stator core.
Figure 21:
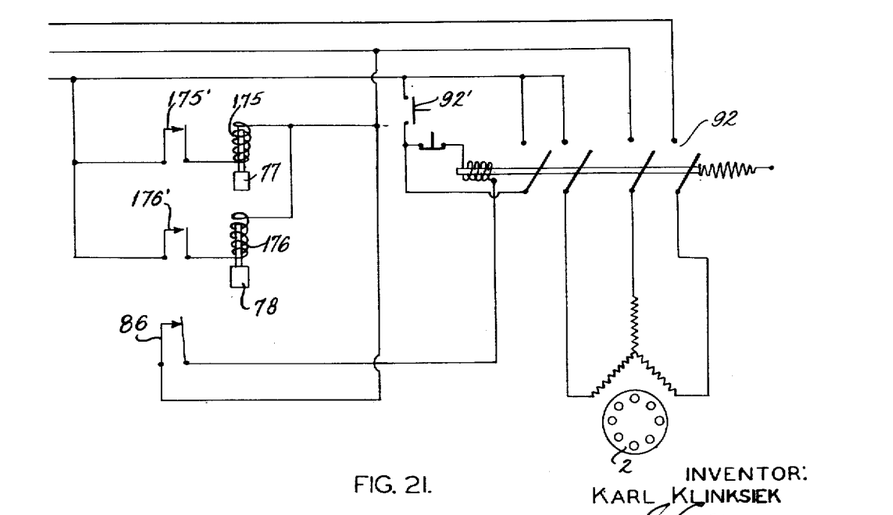
Figure 21 is a wiring diagram of the control circuits for the machine.

As previously indicated, the degree of oscillation of the winding head (the part 37 carried by the ram and the shuttles pivotally mounted thereon) is determined by cams 25, 26, and 27 on shaft 28. The minimum oscillation occurs when cam 25 engages the rocking arm roller 24 and the maximum when cam 27 engages that roller. The automatic means for accomplishing longitudinal shifting of shaft 28 to determine which cam shall be operative to control the oscillation of the winding head comprises a counter mechanism 72 of well-known construction and which embodies switches 175' and 176' diagrammatically indicated in Figure 21. Counter 72 is driven from shaft 5 by means of gears 74, 75, and 76 (Figure 1). The counter mechanism is also provided with an operating lever 73 for its manual adjustment and operation. The counter mechanism switches 175' and 176' control the circuits of solenoids 175 and 176, respectively. These solenoids operate plungers 77 and 78 which cooperate with plate 65 which moves with shaft 28. When the solenoids are deenergized, the plunger return springs 79 and 80 maintain the plungers in the position shown in Figure 18. These plungers operate in slide bearings such as 77' (Figure 4). Plungers 77 and 78 cooperate with walls of slots 81 and 82, respectively, in the edge of plate 65. At the beginning of the winding operation the relative position of plungers 77 and 78 in the slots is indicated in Figure 19 and in which plunger 77 abuts tooth 83 and holds the plate and, therefore, shaft 28 in the position in which the follower roller 24 engages cam 25.

Figure 18:
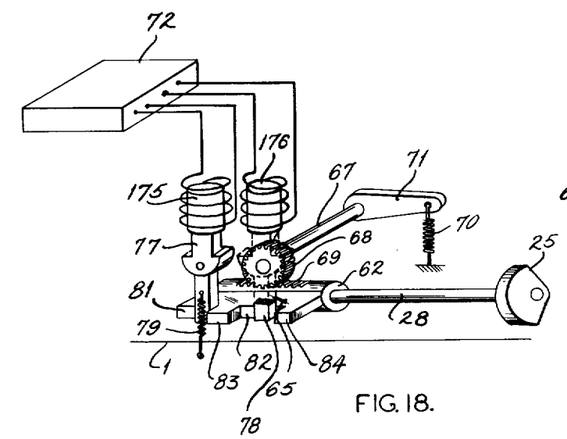
Figure 18 shows a schematic view of the selector and timing mechanism for changing the degree of oscillation of the wire carrying shuttles.
Figure 19:
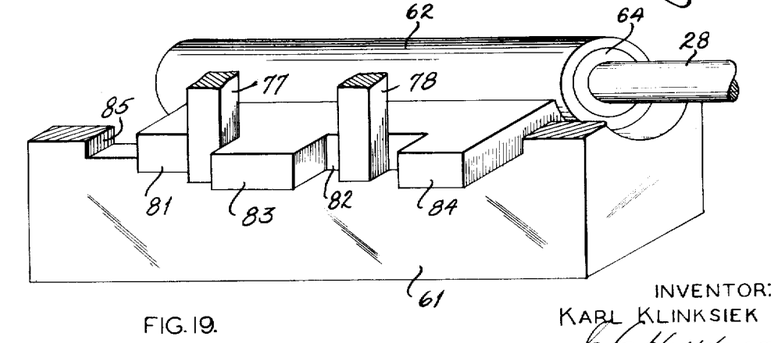
Figure 19 shows an enlarged perspective view of the selector mechanism.
Figure 20:
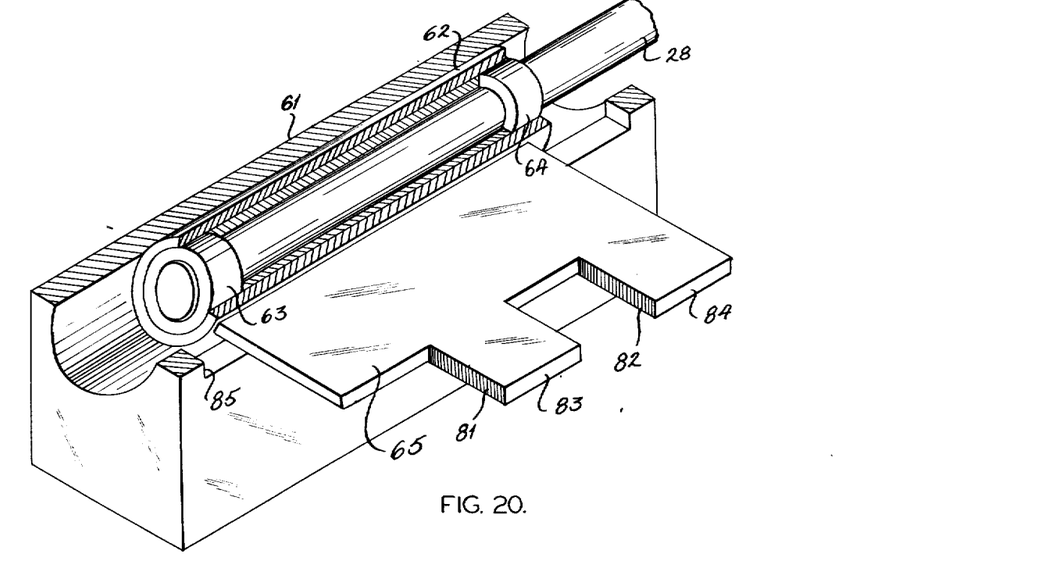
Figure 20 shows an enlarged perspective and sectional detail view of the slide bearing for the cam shaft controlling the degree of oscillation of the wire carrying shuttles.

When the required number of turns has been wound in these slots, the counter will close switch 175' (Figure 21) energizing the circuit of solenoid 175 which will withdraw plunger 77 from slot 81 and thereby permit spring 70 to shift shaft 28 to the left until tooth 84 on plate 65 abuts plunger 78, as viewed in Figures 18 and 19, placing the follower roller 24 in engagement with cam 26 on shaft 28 whereby ram 18 will be oscillated through a larger arc to align the wire carrying shuttle 35 with the slots 56, 56' to wind the second coil of the pole.

When the required number of turns has been wound in slots 56, 56', the counter will close switch 176' energizing the circuit of solenoid 176 and withdrawing plunger 78 from slot 82 and enabling spring 70 to move shaft 28 to the left until plate 65 abuts the surface 85 formed on the bearing member 61 and positioning the follower roller 24 opposite cam 27, thus causing ram 18 to oscillate through a larger arc to apply the wire to slots 57, 57'. When the required number of turns has been wound in slots 57, 57', the counter will open normally closed switch 86 (Figure 21) to stop the machine by stopping the rotation of drive motor 2.

Figure 8:
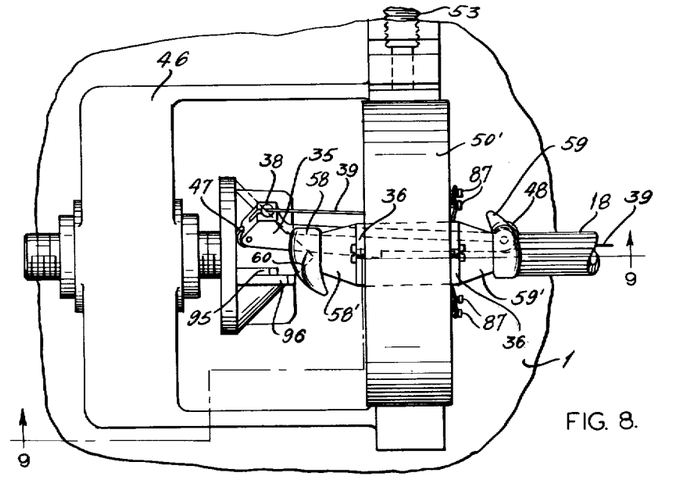
Figure 8 shows an enlarged plan view of the wire carrying shuttles, horn, stator and holder assembly, shuttle guide member and their supports.
Figure 9:
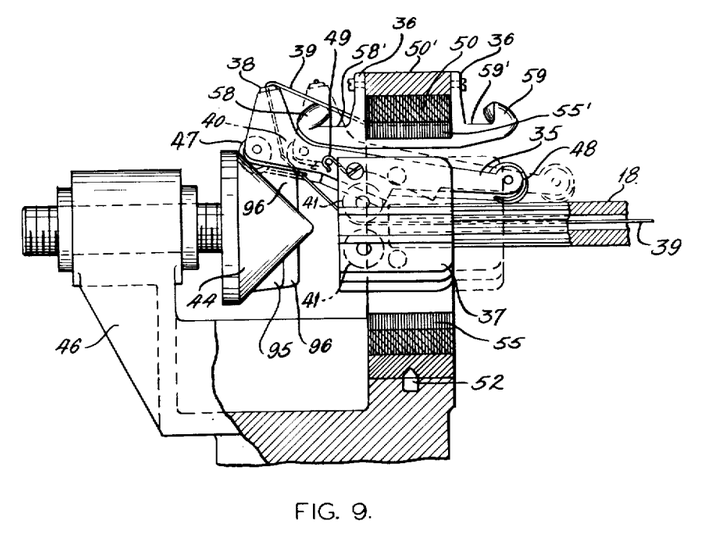
Figure 9 shows a vertical section of the structure in Figure 8 along the line 9—9 thereof.
Figure 10:
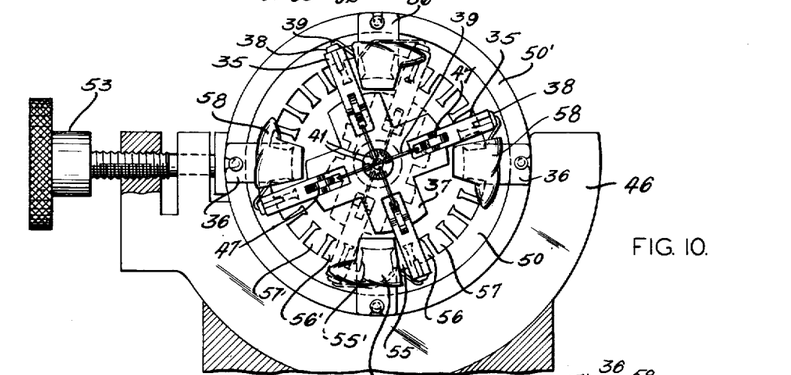
Figures 10–14 are drawings showing the paths taken by the wire when forming the ends of the coils as it is being wound in the various slots of the stator core.
Figure 13:
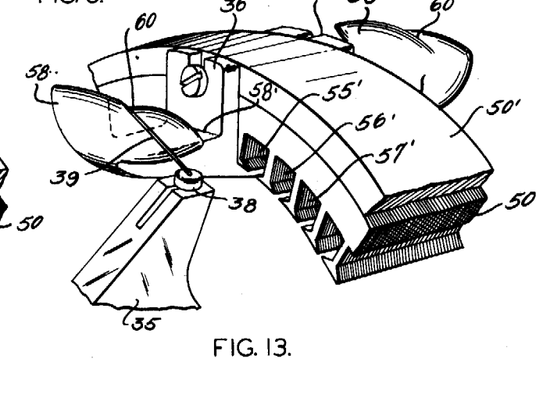

As indicated, for example, in Figures 9 and 10, a U-shaped element is associated with the stator core at each pole center, each of these elements being provided with horns 58 and 59 to aid in guiding the wire to the bottom of the slots during the winding operation. As shown in Figure 8, the heel end of the horn structure is positioned adjacent an extension of the inner wall of a slot of the inner slot pair and the horn has the conformation indicated in Figure 8 and in perspective views of Figures 13 and 14. The upper surface of each horn has a groove 60 indicated, for instance, in Figures 13 and 14 into which the wire is brought and temporarily maintained during the winding of the two outside slot pairs of each pole. The function of this groove 60 will be more fully indicated in the description of the operation of the machine.

Referring now to the operation of the machine, the stator core 50 is inserted in the stator ring 50' where it is held in place therein by projections 36 on the horn carrying element and which are secured to ring 50' and the whole placed in the recess in sub-frame 46 where it is accurately located in position by the dowel pin 52 which fits in a suitable aperture in the stator ring 50' as particularly illustrated in Figure 9. The stator ring 50' is clamped in place by a clamping screw 53.

The wire 39 is drawn through thimble 38 of the wire carrying shuttle 35 and is fastened to anchor pins 87 (Figure 8) on the stator ring 50'. After anchoring the wire, the hand wheel 91 is turned to actuate ram 18 and move same forwardly to cause wire 39 to fall into slot 55 which in the completed winding will constitute one coil side of the inner coil. The counter 72 is set to zero position, in which position the circuits of solenoids 175 and 176 are open. The operating handle 66 is rotated counterclockwise to position plate 65 and shaft 28 in the extreme right position, thereby tensioning spring 70 and placing roller 24 in engagement with cam 25. In this position the plungers 77 and 78 drop into slots 81 and 82 in plate 65 and plunger 77 holds shaft 28 in its extreme right position.

Following the above described preliminary operations motor 2 is started by closing switch 92' and energizing the solenoid-operated starter switch 92 and the winding of the stator proceeds without manual attention thereafter. During the major portion of the longitudinal movement of the ram in the "forward" direction, roller 24 rides on a circular part of cam 25 whereby the position of rack bar 21 does not change and no rotative movement is applied to the ram. When the ram approaches the forward limit of its travel, an offset surface of cam 25 comes into alignment with roller 24 and spring 31 is thereby permitted to actuate rack 21 to initiate the rotative or oscillating movement of the ram and of the shuttle 35 which movement continues until the wire carrying thimble 38 is brought into alignment with slot 55'. At this time another circular part of the cam surface comes into engagement with roller 24 whereby the ram will not be rotated on its return movement during which the wire will be aligned with slot 55'. At a point approximating the rearward limit of travel of the ram, another offset portion of cam 25 actuates the rocking arm to move rack 21 in the opposite direction and bring thimble 38 into alignment with slot 55.

In order to position the wire in the slots it must be moved radially at the end of each reciprocatory movement of the ram. When the ram has progressed forwardly to a point such that thimble 38 of the wire carrying shuttle 35 has passed beyond the stator core 50, roller 47 in the toe of the wire carrying shuttle 35 contacts the guide member 44 (Figures 6 and 9) and rides up thereon in response to the continued forward travel of ram 18, thus raising thimble 38 to a point that is radially outward from the bottom of slot 55. Near the end of the forward travel of ram 18, the oscillatory motion described in connection with cam 25 is imparted thereto which moves thimble 38 over to a position in line with slot 55' and causes wire 39 to cross horn 58 and the wire begins to contact the upper surface of the horn slightly prior to the time that the wire carrying shuttle 35 begins to move back through the bore in the stator core in response to the rearward movement of ram 18. As ram 18 moves to the rear, roller 47 rides down guide member 44, lowering thimble 38 so that it will clear the teeth of stator core 50. As thimble 38 of shuttle 35 moves to the right, it takes up the slack (Figures 10–12) necessarily introduced into wire 39 by the change in direction of travel of the wire carrying shuttle 35 and causes the wire to slide off the nose of horn 58 (Figure 12) and lie in channel 58' (Figures 8 and 9) between the horn and the adjacent projection 36 of the U member. With the continuation of the movement to the right of ram 18, the wire is pulled through slot 55'. When ram 18 approaches the rear end of its travel, roller 48 on the rear end of the wire carrying shuttle 35 engages the internal surface of member 45 and moves toward ram 18 (Figure 6). This action causes the wire carrying shuttle 35 to pivot around the pin on which it is mounted, raising thimble 38 to a point radially beyond the bottom of slot 55' at which time ram 18 is oscillated to such a position as to align thimble 38 with the slot 55 (Figure 10) and cause wire 39 to cross horn 59. With the motion of the ram now reversing, thimble 38 drops to a position to enable it to pass through the bore of the stator core 50 and wire 39 touches the nose of horn 59. With the continued forward motion of ram 18, wire 39 is pulled into slot 55 where the taking up of the slack causes the wire to slide off the nose of horn 59 and lie in channel 59' between horn 59 and a projection 36 of the U member. This sequence of events continues until a predetermined number of turns has been wound in slots 55 and 55'.

After the first coil is fully wound, switch 175' in counter 72 closes, energizing solenoid 175 which lifts plunger 77, thus allowing plate 65 to take up a new position against plunger 78 in response to the force exerted thereon by spring 70. This movement of plate 65 positions shaft 28 so that the follower roller 24 is now in engagement with cam 26. The cam 26 is shaped similarly to cam 25 but differing in the amount of travel that it imparts to rack 21. The oscillation of the ram following the shift to bring cam 26 into alignment with roller 24 aligns thimble 38 with slot 56 on the forward stroke of ram 18 and on the succeeding oscillation with slot 56′ on the rearward stroke of the ram. There is no difference in the action of thimble 38 on the forward stroke of ram 18 to that described in connection with the winding of slots 55 and 55′ but as ram 18 starts its rearward stroke, roller 47 rides the projection 95 on member 44. When roller 47 reaches the end of projection 95, it is snapped down against a conical portion of member 44 by the action of spring 49. During this motion wire 39 feeds through thimble 38 and a kink is left in the wire similar to that shown at 98 in Figure 14. It is necessary to have this kink as otherwise the wire would not feed into the mouth of slot 56′ when thimble 38 passes below same on the return stroke of ram 18. Due to the difference in the lever arms of rollers 47 and 48 on shuttle 35, which was found necessary in the particular machine illustrated, no projection is required in member 45 to cause the wire to be guided into slot 56 on the forward stroke of ram 18. Therefore, the downward movement of the thimble permitted by member 45 is the same when winding slots 56 and 56′ as described in connection with the winding of slots 55 and 55′.

After a predetermined number of turns has been wound in slots 56 and 56′, switch 176′ is closed by counter 72 closing the circuit to solenoid 176, thereby raising plunger 78 which releases plate 65 of bearing 61 and allows it to move to its extreme left position abutting surface 85 in respose to the force exerted by spring 70. The movement of plate 65 carries with it shaft 28 to cause the follower roller 24 to engage cam 27. The cam 27 has a form similar to that of cams 25 and 26, but differing in size, and imparts oscillatory motion to the ram which aligns the wire carrying shuttle 35 and thimble 38 with slot 57 on the forward stroke of the ram. The action of thimble 38 during the forward stroke of ram 18 is exactly the same as described in connection with the winding of slot 55. Upon nearing the end of the forward stroke, ram 18 is oscillated to align the thimble 38 with slot 57′. At the beginning of the rearward stroke, roller 47 on the shuttle 35 rides on the top of projection 96 on member 44 until it reaches the end thereof and suddenly drops down to the conical surface of member 44. During this motion the wire feeds through thimble 38 in the same manner as previously referred to in the description of the winding of slots 56 and 56′, a kink 98 being left in the wire whereby it may be introduced into the mouth of slot 57′ without interference from the tips of the teeth of that slot. Continued rearward movement of the ram then results in the wire being drawn over the nose of horn 58 into channel 58′.

Continued rearward movement of ram 18 causes roller 48 on the rear end of shuttle 35 to contact the interior surface of member 45 and thus raise thimble 38 as previously described. Ram 18 is now oscillated by cam 27 to bring the threading means and thimble 38 in line with slot 57 and as the ram moves forward, roller 48 rides the projection 90 on the interior surface of member 45 to the end thereof where it is released, allowing thimble 38 to drop to a position so that it may pass through the stator bore. In dropping down the wire 39 feeds through thimble 38 in the same manner as explained in the description of the function of projections 95 and 96. The winding process continues until a predetermined number of turns has been wound in slots 57 and 57′ at which time normally closed switch 86 in counter 72 opens the holding circuit for switch 92 and stops motor 2.

The actions described above in detail for a single stator pole wound with three concentric coils apply to each pole of the stator because all are wound simultaneously and in an identical manner.

Figure 15:
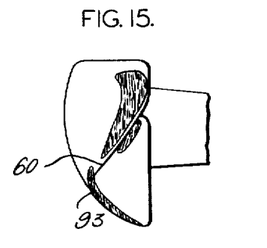
Figures 15, 16, and 17 are plan views of one of the horn structures illustrating the area thereof contacted by the wire in its movement relative to the horn during the winding of the three different coils wound on each stator pole.

The general function of the winding horns mounted at each end of each winding pole of the stator is to so modify the linear conformation of the wire between the thimble and the end of the slot through which it has just been drawn (from the shape it would assume if the horn were not present) as to facilitate the entrance of the wire into the end of the other slot of the winding pair under the motions imparted to it by the winding thimble when the latter is moved in the reverse reciprocatory direction through the stator core. Figures 8 and 9 show the position of the wire and the winding thimble at the end of the reciprocatory motion of the latter in one direction. During the succeeding oscillatory motion of the winding thimble it remains in substantially the same radial position as shown in Figures 8 and 9 and carries the wire above the rear end of the horn. When the oscillatory motion is completed, the reverse reciprocation of the thimble begins and during the initial part of this motion when the first pair of slots is being wound, the winding thimble also moves downwardly in accordance with the slope of the conical surface of the shuttle guiding cam element 44. Since the wire is restrained by the resilient clamp 43 against backward movement through the ram, it will be feed through the thimble during the downward movement of the latter just referred to but the position of the horn surface is such that the length of wire thus added to the length between the thimble and the end of the winding slot through which the wire was drawn before the oscillatory and radial motions of the thimble began, is insufficient to prevent the wire from coming into contact with the upper surface of the horn and during the latter part of the radial retraction of the thimble and the beginning of its return reciprocation, the wire will contact with the horn along the lines such as indicated in Figure 15 and be given a slight bend which will so shape it as to facilitate its entrance into the succeeding winding slot without contacting the lip thereof and also will maintain it in a sufficiently elevated position resulting in its entry into the bottom of the slot (if this part of the slot is not already occupied by preceding turns), notwithstanding the fact that at the moment it enters the slot, the winding thimble is within the frame and at a lower level than the mouth of the slot.

Figure 14:
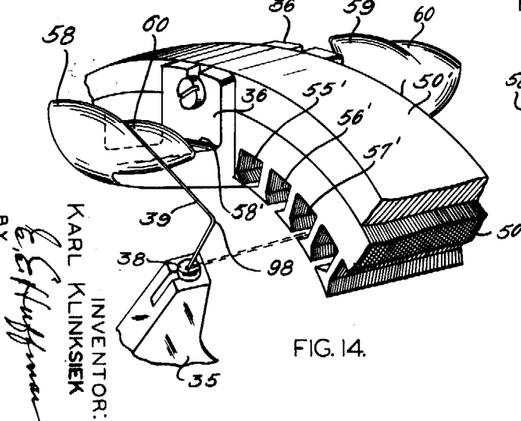

The horns are relatively near in a circumferential direction to the slots of the first pair and, therefore, can readily maintain the wire at the height necessary to cause it to enter the bottoms of these slots. For winding slot pairs 56, 56′ the cam element 44 is provided with a part 95 having an upper surface extending in the direction of reciprocatory movement of the winding shuttle and in the oscillatory movement of the shuttle from one slot pair to the other, roller 47 of the shuttle is brought to a position above this last mentioned surface on the cam element. Accordingly, during the first part of the succeeding reciprocatory movement, the radial position of the winding thimble is maintained and then the thimble quickly drops to the position it occupies during the return movement through the stator core. During this downward movement, the wire is fed through the thimble, as previously described, and the stiffness and inertia of the wire results in a rather sharp bend being formed in it. Such a bend is illustrated in Figure 14 which shows the application of the wire to one of the slots of pair 57, 57' and during which application the roller 47 of the shuttle first cooperates with a horizontal surface 96 on cam 44 and then suddenly drops to its final position for return reciprocation in the same manner as just referred to in connection with the description of the application of the wire to a slot of pair 56, 56'.

For the reasons just indicated the wire is maintained high enough to enter the bottoms of slots 56, 56' and 57, 57' and the relatively sharp bend in the wire formed upon sudden change of radial position of the shuttle facilitates entrance of the wire into the slots without contacting the corners thereof. The motion of the wire over the horns is momentarily arrested by contact of the wire with the grooves 60 and whereby under the reciprocatory movement of the shuttle, a bend is produced in the wire which results in the part of the wire above and adjacent the thimble being in proper space position to enter the desired slot when it reaches the entrance to that slot. It is desirable that the wire slip off the horn shortly after the part aligned with the slot being wound has first entered that slot and groove location and dimensions are so chosen in view of the fixed factors of wire stiffness and movement of the wire threading thimble as to achieve this result.

It will be apparent that factors involved in the determination of the proper retarding action of the horn on the wire during winding operation include stiffness of the wire, the bore of the stator being wound, and the span of the coil being formed, but since these factors are known, the proper depth and location of the arresting grooves 60 on the horns for winding a particular frame with the wire selected can be readily determined. It has been found in winding with No. 19 "enameled" wire a four pole stator having an internal core diameter of 4⅜ inches, a suitable groove in the horn surface is one .08 inch deep and approximately .12 inch wide at the end nearest the slot which the wire is entering when leaving the horn. The groove has rounded edges and extends across the upper surface of the horn at an angle to the plane of the end of the stator frame, as indicated in the drawings, and is preferably wider at the end nearest the stator frame, being .28 inch wide at this point in the particular machine just mentioned.

Figure 16:
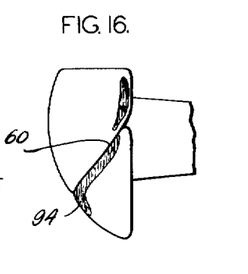
Figure 17:
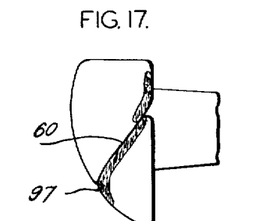

Figures 15, 16, and 17 are top plan views of one of the winding horns, the bottom of the groove in these horns being indicated by the full lines 60. The shaded areas in these views indicate approximately the portion of the upper horn surface contacted by the wire as it passes over the horn surface during the oscillatory motion of the winding shuttle and the initial part of the succeeding reciprocatory motion, Figures 15, 16, and 17 showing the areas contacted while winding slot pairs 57, 57', 56, 56' and 55, 55', respectively.

Having fully described my invention, that which I claim as novel and desire to protect by Letters Patent of the United States is:

1. In a machine for winding an internally slotted frame forming the core for a dynamo-electric machine, a wire guiding shuttle provided with a wire delivery thimble, means for reciprocating the shuttle in paths embraced by the frame and each in radial alignment with a slot thereof, means operative after the shuttle has passed through the frame in a reciprocatory movement for imparting radial movement to the part of the shuttle carrying the wire delivery thimble to bring the delivery end of said thimble to a position having greater radial displacement from the axis of the frame than the bottom of the wire receiving slots thereof and to thus tend to carry the wire into the bottom of the slot then in alignment with the thimble, means operative prior to the beginning of the return reciprocation of the shuttle to oscillate said shuttle to move the wire delivery thimble into alignment with the slot to which the wire is to be next applied, and stationary means engageable by the wire during the return reciprocation of the shuttle and at a point between the thimble and the end of the slot to which the wire was last applied to bend the wire to a sufficient extent that a part thereof having proper radial displacement to enter said next slot will be aligned with the end opening thereof when it is brought to a point adjacent said opening by the movement of the shuttle.

2. In a machine for winding an internally slotted frame forming the core for a dynamo-electric machine, a ram element mounted for reciprocating and rotative movement, a wire guiding shuttle provided with a wire delivery thimble and mounted on said ram for reciprocating movement therewith and for pivotal motion relative thereto, elements on each side of the frame and engageable by the shuttle during part of its reciprocatory movement to cause rotation of the shuttle on its pivot to bring the wire delivery end of the thimble to a point having greater radial displacement from the axis of the dynamo electric machine frame than the bottoms of the wire receiving slots therein, means for rotating the ram and associated shuttle through an angle equal to the angle of displacement between the pair of slots being wound, and means for reciprocating the ram.

3. In a machine for winding an internally slotted frame forming the core for a dynamo-electric machine, a wire guiding shuttle provided with a wire delivery thimble, means for reciprocating said shuttle in a path embraced by the frame, means positioned on each side of the frame and operative after the shuttle has passed through the frame in a reciprocatory movement for imparting radial movement to the part of the shuttle carrying the wire delivery thimble to bring the wire delivery end of said thimble to a point having greater radial displacement from the axis of the frame than the bottoms of the wire receiving slots thereof, means operative prior to the beginning of the return reciprocation of the shuttle through the frame to oscillate the shuttle to move the wire delivery thimble into alignment with the slot to which the wire is to be next applied, and means engaging the wire at a point between the thimble and the end of the slot previously wound to so retard its motion under the influence of movement of the thimble on its succeeding return reciprocation as to form a sufficient bend therein that one part of said wire length will be in longitudinal alignment with the other slot of the winding pair when it is moved to a point adjacent the end of said slot.

4. In a machine for winding an internally slotted frame forming the core for a dynamoelectric machine, a ram element mounted for reciprocating and rotative movement, a wire guiding shuttle provided with a wire delivery thimble and mounted on said ram for reciprocating movement therewith and for pivotal motion relative thereto, a cam element at each side of the frame and each engageable by the shuttle during part of its reciprocatory movement to cause rotation of the shuttle on its pivot to bring the wire delivery end of the thimble to a point having greater radial displacement from the axis of the dynamoelectric machine frame than the bottoms of the wire receiving slots therein, means for rotating the ram and associated shuttle through an angle equal to the angle of displacement between the pair of slots being wound, means for reciprocating the ram to alternately position the wire delivery thimble on opposite sides of the frame, and a horn element mounted at each side of the frame and in alignment with the space between the inner slots of a winding pole, said horns having a surface positioned to be contacted by a part of the wire during movement imparted to said part by the wire delivery thimble during a portion of movement of the latter from a position of alignment with one slot to a position within the stator frame and in alignment with the other slot of the same winding pair, said horns each being provided with a part engageable by the wire to temporarily arrest its motion over the horn surface.

5. A machine for winding an internally slotted frame forming the core for a multi-pole dynamoelectric machine, the frame being provided with a plurality of pairs of winding slots, a wire guiding shuttle and means for reciprocating the same in paths embraced by the frame, means positioned at each side of the frame and operative after the shuttle has passed through the frame in a reciprocatory movement for imparting radial movement to the shuttle to bring the wire delivery part thereof to a point having greater radial displacement on the axis of the frame than the bottoms of the wire receiving slots thereof, means operative prior to the beginning of the return reciprocation of the shuttle through the frame to oscillate the shuttle to align the wire delivery portion thereof with the slot to which the wire is to be next applied, and means operative when the wire is to be applied to selected wire slots to maintain the shuttle in substantially uniform radial displacement from the axis of the frame during the initial portion of the reciprocable movement of the shuttle and then to suddenly change the radial position of the shuttle substantially to that occupied while the shuttle is passing through the frame.

6. A machine for winding an internally slotted frame forming the core for a multi-pole dynamoelectric machine, the frame being provided with a plurality of pairs of winding slots, a wire guiding shuttle and means for reciprocating the same in paths embraced by the frame, a stationary cam element positioned at each side of the frame and having a conical cam surface engageable by the shuttle for imparting radial movement thereto during the final portion of its reciprocable movement, said cam being provided with a portion having a surface substantially parallel with the axis of the frame, said surface being engaged by the shuttle and maintained thereby in substantially uniform radial displacement from the axis of the frame during the initial portion of a reciprocation of the shuttle for applying wire to a selected slot, and means operative when the shuttle passes out of engagement with said surface to quickly move said shuttle to the radial position it occupies while passing through the frame.

7. A machine for winding an integrally slotted frame forming the core for a multi-pole dynamoelectric machine, the frame being provided with a plurality of pairs of winding slots, a wire guiding shuttle and means for reciprocating the same in paths embraced by the frame, a stationary cam element positioned at each side of the frame and having a conical cam surface engageable by the shuttle for imparting radial movement thereto during the final portion of its reciprocable movement, said cam being provided with a portion having a surface substantially parallel with the axis of the frame, said surface being engaged by the shuttle and maintained thereby in uniform radial displacement from the axis of the frame during the initial portion of a reciprocation of the shuttle for applying wire to a selected slot, means operative when the shuttle passes out of engagement with said surface to quickly move said shuttle to the radial position it occupies while passing through the frame, a source of supply of winding wire, and means located between said source and said shuttle opposing motion of the wire toward said source during the sudden change of radial position of the shuttle.

8. A machine for winding an internally slotted frame forming the core for a multi-pole dynamoelectric machine having a plurality of pairs of winding slots for each pole, a wire guiding shuttle provided with a wire delivery thimble, means for reciprocating said shuttle in paths embraced by said frame, means positioned at each side of the frame and operative after the shuttle has passed through the frame in a reciprocatory movement to impart radial movement to the part of the shuttle carrying the wire delivery thimble to bring said wire delivery end of said thimble to a point having greater radial displacement from the axis of the frame than the bottoms of the wire receiving slots thereof, means for oscillating the shuttle between each reciprocatory movement, and means to automatically increase the extent of oscillation of the shuttle after a predetermined number of turns has been applied to a slot pair.

9. A machine for winding an internally slotted frame forming the core for a multi-pole dynamoelectric machine having winding slots for each pole, a wire guiding shuttle provided with a wire delivery thimble, means for reciprocating said shuttle in paths embraced by said frame, means positioned at each side of the frame and operative after the shuttle has passed through the frame in a reciprocatory movement and imparting radial movement to the part of the shuttle carrying the wire delivery thimble to bring said wire delivery end of said thimble to a point having greater radial displacement from the axis of the frame than the bottoms of the wire receiving slots thereof, means for oscillating the shuttle between each reciprocatory movement, and means to automatically increase the extent of oscillation of the shuttle after a predetermined number of turns has been applied to a slot pair, said oscillating means comprising a cam assembly shiftable to place a selected cam in operative position.

10. In a machine for winding an internally slotted frame forming the core for a multi-pole dynamoelectric machine, said frame being provided with a plurality of pairs of winding slots for each pole, a ram element mounted for reciprocating movement in the axis of the frame, said ram element being provided with a wire guiding shuttles for cooperation with each pole to apply a winding thereto, means for imparting reciprocating movement to the ram, an element at each side of the frame which is engageable by each shuttle during part of its reciprocatory movement and produces radial displacement of the wire delivery portion of the shuttles when at the ends of their reciprocatory paths, means for rotating the ram and associated shuttles through angles equal to the angles of displacement between the pairs of slots being wound, and wire deforming elements mounted at each side of the frame and in alignment with the centers of each of the poles thereof, each of said deforming elements engaging a part of the wire which forms an end turn of a coil before it is drawn to final end turn position by the reciprocation of a shuttle.

KARL KLINKSIEK.

REFERENCES CITED

The following references are of record in the file of this patent:

UNITED STATES PATENTS

| Number | Name | Date |
|---|---|---|
| 1,977,828 | Laib et al. | Oct. 23, 1934 |
| 2,197,117 | Ammann et al. | Apr. 16, 1940 |
| 2,389,336 | Wirth | Nov. 20, 1945 |

Certificate of Correction

Patent No. 2,579,585 December 25, 1951

KARL KLINKSIEK

It is hereby certified that error appears in the printed specification of the above numbered patent requiring correction as follows:

Column 12, line 15, for "integrally" read *internally*;

and that the said Letters Patent should be read as corrected above, so that the same may conform to the record of the case in the Patent Office.

Signed and sealed this 15th day of April, A. D. 1952.

[SEAL]

THOMAS F. MURPHY,
*Assistant Commissioner of Patents.*